United States Patent
Izumi

(10) Patent No.: US 10,625,754 B2
(45) Date of Patent: Apr. 21, 2020

(54) CONTROL APPARATUS, CONTROL METHOD, AND COMPUTER PROGRAM

(71) Applicant: SUMITOMO ELECTRIC INDUSTRIES, LTD., Osaka-shi, Osaka (JP)

(72) Inventor: Tatsuya Izumi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/342,121

(22) PCT Filed: Apr. 13, 2018

(86) PCT No.: PCT/JP2018/015553
§ 371 (c)(1),
(2) Date: Apr. 15, 2019

(87) PCT Pub. No.: WO2019/030984
PCT Pub. Date: Feb. 14, 2019

(65) Prior Publication Data
US 2019/0256109 A1    Aug. 22, 2019

(30) Foreign Application Priority Data

Aug. 10, 2017  (JP) ................................ 2017-155361

(51) Int. Cl.
*B60W 50/14* (2020.01)
*B60R 16/023* (2006.01)
(Continued)

(52) U.S. Cl.
CPC ............. *B60W 50/14* (2013.01); *B60R 16/02* (2013.01); *B60R 16/0231* (2013.01);
(Continued)

(58) Field of Classification Search
CPC ......... B60W 50/14; B60W 2050/0083; B60W 2050/0026; B60W 2710/30;
(Continued)

(56) References Cited

U.S. PATENT DOCUMENTS

2005/0029871 A1* 2/2005 Mori ....................... B60R 25/00
307/10.3
2012/0323402 A1* 12/2012 Murakami ................ G06F 8/65
701/1
(Continued)

FOREIGN PATENT DOCUMENTS

JP    2013-002958 A    1/2013
JP    2013-189944 A    9/2013
(Continued)

*Primary Examiner* — Muhammad Shafi
(74) *Attorney, Agent, or Firm* — Baker Botts L.L.P.; Michael A. Sartori

(57) ABSTRACT

A control apparatus including: a unit configured to communicate with on-vehicle control devices via a communication line; a storage unit configured to store therein a reference table that defines whether each of the on-vehicle control devices is a permitted or unpermitted device; a monitoring unit configured to monitor whether there is a user operation that instructs start of an engine; and a determination unit configured to determine whether to permit start of the engine according to user operation, on the basis of the reference table and a state of update of a control program in the on-vehicle control device when user operation is detected. The permitted device is an on-vehicle control device for which start of the engine during update of the control program is permitted, and the unpermitted device is an on-vehicle control device for which start of the engine during update of the control program is not permitted.

15 Claims, 8 Drawing Sheets

(51) Int. Cl.
*B60R 16/03* (2006.01)
*F02N 11/08* (2006.01)
*G06F 8/65* (2018.01)
*F02N 15/00* (2006.01)
*B60R 16/02* (2006.01)
*B60W 50/00* (2006.01)

(52) U.S. Cl.
CPC .............. *B60R 16/03* (2013.01); *F02N 11/08* (2013.01); *F02N 15/00* (2013.01); *G06F 8/65* (2013.01); *B60W 2050/0026* (2013.01); *B60W 2050/0077* (2013.01); *B60W 2050/0083* (2013.01); *B60W 2710/06* (2013.01); *B60W 2710/18* (2013.01); *B60W 2710/20* (2013.01); *B60W 2710/30* (2013.01)

(58) Field of Classification Search
CPC ......... B60W 2710/20; B60W 2710/18; B60W 2050/0077; B60W 2710/06; F02N 11/08; B60R 16/0231; B60R 16/03; G06F 8/65

USPC .......................................................... 701/99
See application file for complete search history.

(56) References Cited

U.S. PATENT DOCUMENTS

2013/0104186 A1\* 4/2013 Dietz ..................... H04L 63/10
726/1
2017/0242678 A1\* 8/2017 Sangameswaran ....... G06F 8/65

FOREIGN PATENT DOCUMENTS

| JP | 2015-37938 A | | 2/2015 |
| JP | 2015-196445 A | | 11/2015 |
| JP | 2016-218932 | \* | 12/2016 |
| JP | 2016-218932 A | | 12/2016 |
| JP | 2017-027549 A | | 2/2017 |

\* cited by examiner

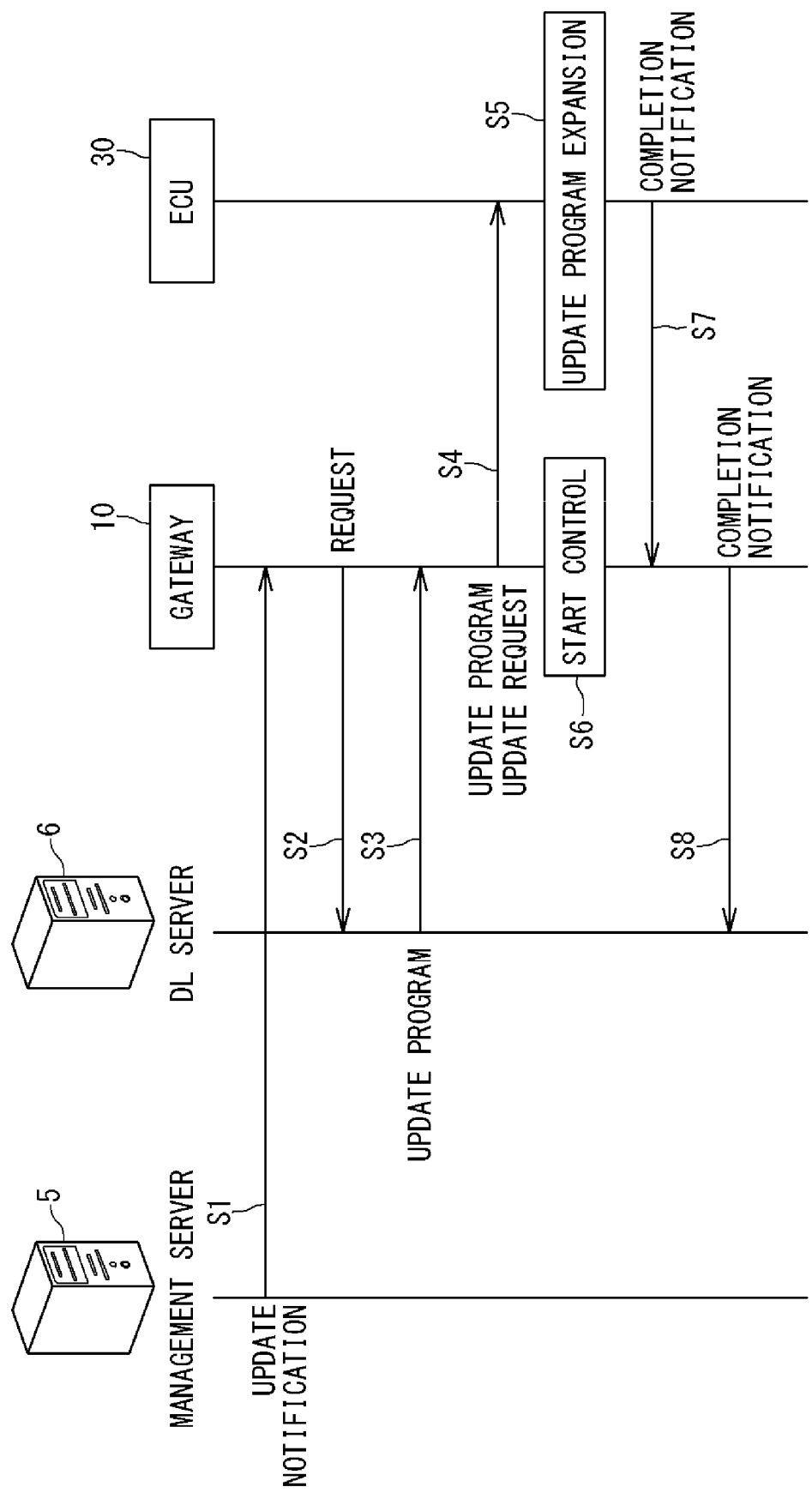

FIG. 6A

UPDATING ･ ･ ･

ENGINE CANNOT BE STARTED

PLEASE WAIT FOR X MIN

FIG. 6B

UPDATING ･ ･ ･

ENGINE CANNOT BE STARTED

PLEASE WAIT FOR X MIN

DO YOU WANT TO INTERRUPT UPDATING?

| OK |

CONTROL APPARATUS, CONTROL METHOD, AND COMPUTER PROGRAM

TECHNICAL FIELD

The present invention relates to a control apparatus, a control method, and a computer program.

This application claims priority on Japanese Patent Application No. 2017-155361 filed on Aug. 10, 2017, the entire contents of which are incorporated herein by reference.

BACKGROUND ART

In the automotive field in recent years, vehicles have progressed in functionality, and a diverse range of devices are installed on vehicles. Accordingly, vehicles are equipped with large numbers of control devices, so-called ECUs (Electronic Control Units), for controlling these on-vehicle devices.

Examples of types of ECUs include: traveling-type ECUs that control an engine, a brake, EPS (Electric Power Steering), and the like in response to operations on an accelerator, a brake, and a handle; body-type ECUs that control ON/OFF of interior lights and headlights, sound of an alarm unit, and the like in response to switch operations performed by an occupant; and meter-type ECUs that control operations of meters arranged near the driver's seat.

Generally, each ECU consists of an arithmetic processing unit such as a microcomputer, and implements a control of an on-vehicle device by reading out a control program stored in an ROM (Read Only Memory), and executing the read control program.

Control programs of ECUs may differ depending on the shipping destinations, grades, etc., of vehicles. Therefore, old versions of control programs need to be overwritten with new versions of control programs in response to upgrading of control programs. Further, data required for execution of the control programs, such as map information and control parameters, also need to be overwritten.

For example, Patent Literature 1 discloses a technique (on-line update function) of downloading an update program via a network, and performing update of a program by using the update program.

CITATION LIST

Patent Literature

PATENT LITERATURE 1: Japanese Laid-Open Patent Publication No. 2015-37938

SUMMARY OF INVENTION

A control apparatus according to one embodiment includes: a communication unit configured to communicate with one or a plurality of on-vehicle control devices via an in-vehicle communication line; a storage unit configured to store therein a reference table that defines whether each of the on-vehicle control devices is a permitted device or an unpermitted device described below; a monitoring unit configured to monitor whether or not there is a user operation that instructs start of an engine; and a determination unit configured to determine whether or not to permit start of the engine according to the user operation, on the basis of the reference table and a state of update of a control program in the on-vehicle control device when the user operation is detected. The permitted device is an on-vehicle control device for which start of the engine during update of the control program is permitted, and the unpermitted device is an on-vehicle control device for which start of the engine during update of the control program is not permitted.

A control method according to another embodiment is a control method used by a control apparatus configured to communicate with one or a plurality of on-vehicle control devices via an in-vehicle communication line, and the method is configured to control the one or the plurality of on-vehicle control devices. The control apparatus stores therein a reference table that defines whether each of the on-vehicle control devices is a permitted device or an unpermitted device described below. The control method includes: monitoring whether or not there is a user operation that instructs start of an engine; and determining whether or not to permit start of the engine according to the user operation, on the basis of the reference table and a state of update of a control program in the on-vehicle control device when the user operation is detected. The permitted device is an on-vehicle control device for which start of the engine during update of the control program is permitted, and the unpermitted device is an on-vehicle control device for which start of the engine during update of the control program is not permitted.

A computer program according to still another embodiment is a computer program for causing a computer to function as a control apparatus configured to communicate with one or a plurality of on-vehicle control devices via an in-vehicle communication line. The computer stores therein a reference table that defines whether each of the on-vehicle control devices is a permitted device or an unpermitted device described below. The computer program causes the computer to function as: a monitoring unit configured to monitor whether or not there is a user operation that instructs start of an engine; and a determination unit configured to determine whether or not to permit start of the engine according to the user operation, on the basis of the reference table and a state of update of a control program in the on-vehicle control device when the user operation is detected. The permitted device is an on-vehicle control device for which start of the engine during update of the control program is permitted, and the unpermitted device is an on-vehicle control device for which start of the engine during update of the control program is not permitted.

BRIEF DESCRIPTION OF DRAWINGS

FIG. 5 is a sequence diagram showing an example of a flow of control program on-line update which is executed in the program update system.

FIG. 6A shows an example of a notification screen displayed on a user interface device.

FIG. 6B shows another example of a notification screen displayed on the user interface device.

DESCRIPTION OF EMBODIMENTS

Figure 1:
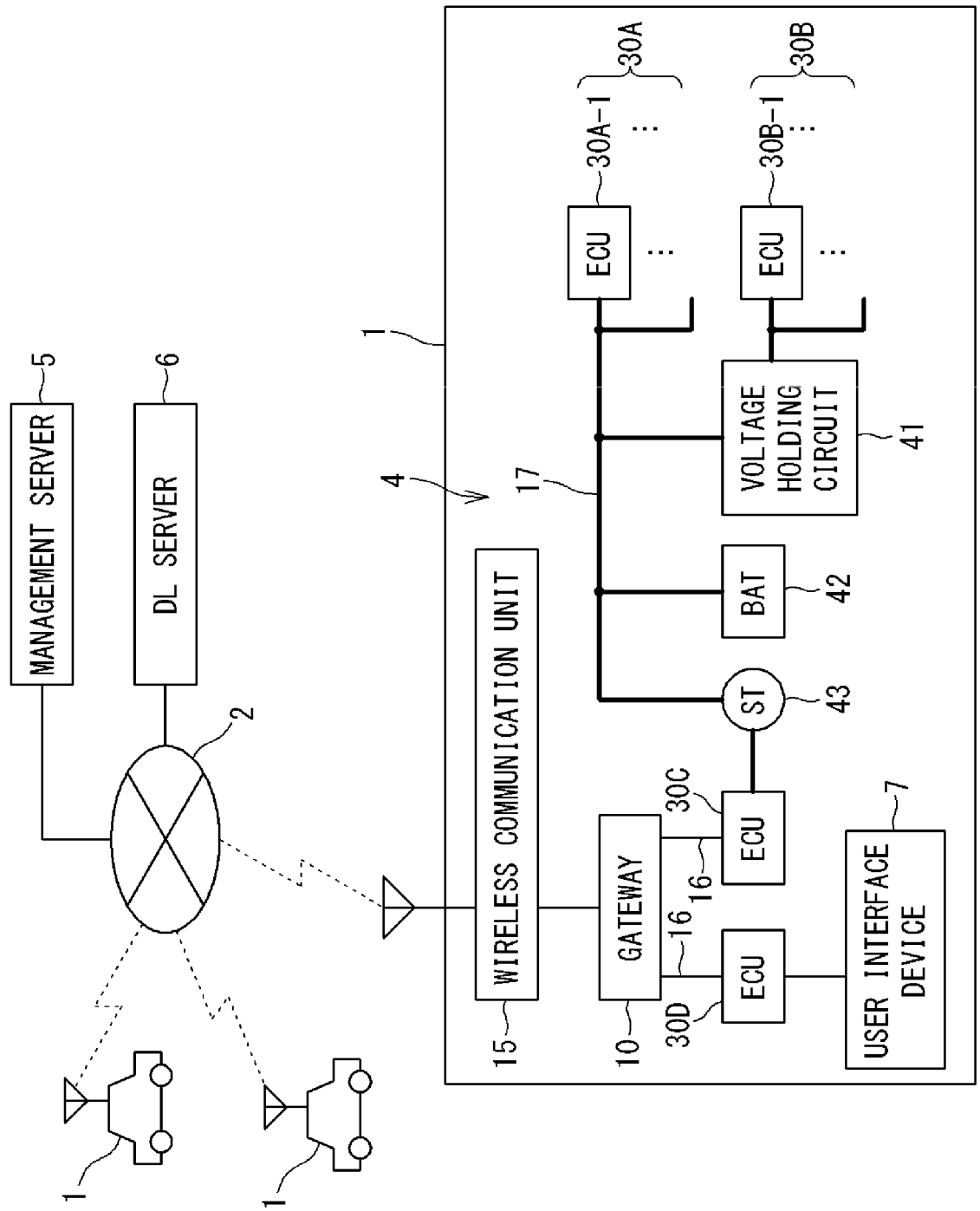
FIG. 1 shows an overall configuration of a program updating system.

<Problems to be Solved by the Present Disclosure>

When an engine is started, a large current is supplied from a battery to a starter to activate the starter. Therefore, the voltage of the battery temporarily drops. If the starter is activated and thereby the voltage of the battery drops during update of a control program in an ECU, a situation may occur in which the power supplied from the battery to the ECU does not reach a power level required for the update process. This situation may cause the update to fail, such as interrupted update or unsuccessful update.

In particular, in the case where on-line update is automatically executed as disclosed in Patent Literature 1, a user may perform an operation to start the engine without noticing that the on-line update is being executed, which may cause the on-line update to fail.

If the ECU, which has failed in updating the control program, is an ECU for controlling a mechanism relating to start of the engine, the ECU may fail to start the engine even when the aforementioned start operation has been performed.

An object in one aspect of the present disclosure is to provide a control apparatus, a control method, and a computer program which can avoid a situation that an engine is not started due to a failure in on-line update caused by a voltage drop with engine start.

<Effect of the Present Disclosure>

According to this disclosure, it is possible to avoid a situation that an engine is not started due to a failure in on-line update caused by a voltage drop with engine start.

[Description Of Embodiments]

Embodiments of the present disclosure include at least the following.

(1) A control apparatus including: a communication unit configured to communicate with one or a plurality of on-vehicle control devices via an in-vehicle communication line; a storage unit configured to store therein a reference table that defines whether each of the on-vehicle control devices is a permitted device or an unpermitted device described below; a monitoring unit configured to monitor whether or not there is a user operation that instructs start of an engine; and a determination unit configured to determine whether or not to permit start of the engine according to the user operation, on the basis of the reference table and a state of update of a control program in the on-vehicle control device when the user operation is detected, permitted device: an on-vehicle control device for which start of the engine during update of the control program is permitted, unpermitted device: an on-vehicle control device for which start of the engine during update of the control program is not permitted.

The permitted device and the unpermitted device are appropriately set in the reference table, thereby avoiding a situation that update of the control program fails due to a voltage drop with engine start. As a result, a situation can be avoided in which the engine is not started due to a failure in on-line update caused by the voltage drop with engine start.

(2) Preferably, the determination unit determines that start of the engine should not be permitted when condition 1 described below is satisfied, and determines that start of the engine should be permitted when condition 2 or condition 3 described below is satisfied, condition 1: there is an on-vehicle control device that is an unpermitted device and whose control program is being updated when the user operation that instructs start of the engine is detected, condition 2: there is no on-vehicle control device whose control program is being updated when the user operation that instructs start of the engine is detected, condition 3: there is an on-vehicle control device that is a permitted device and whose control program is being updated when the user operation that instructs start of the engine is detected.

By using the conditions set in advance, whether or not to permit engine start can be determined with high accuracy. Therefore, it is possible to avoid, with high accuracy, a situation that update of the control program fails due to a voltage drop with engine start. When the update is not affected, the engine can be started according to the user operation that instructs engine start.

(3) Preferably, the permitted device is an on-vehicle control device connected to a first power supply, which supplies power to a starter for starting the engine, via a voltage holding circuit, and the unpermitted device is an on-vehicle control device connected to the first power supply without an intervention of the voltage holding circuit.

Since the voltage of the first power supply drops when the starter is activated, if the control program is being updated in the on-vehicle control device that is supplied with power from the power supply, power required for the update is not supplied to the on-vehicle control device, which may cause the update to fail. Therefore, by defining, as an unpermitted device, the on-vehicle control device connected to the first power supply, the update can be prevented from failing.

(4) Preferably, the permitted device is an on-vehicle control device connected to a second power supply that does not supply power to a starter for starting the engine, and the unpermitted device is an on-vehicle control device that is not connected to the second power supply and is connected to a first power supply that supplies power to the starter for starting the engine.

The on-vehicle control device connected to the second power supply is supplied with power from the second power supply, and therefore is prevented from being affected by a voltage drop in the first power supply. By setting such an on-vehicle control device as a permitted device, the engine can be started according to the user operation while continuing update of the control program.

(5) Preferably, in a case where an on-vehicle control device is connected to the first power supply via an on-vehicle control device that is defined as a permitted device on the reference table, the determination unit determines whether or not to permit start of the engine, with the on-vehicle control device being regarded as a permitted device.

If an on-vehicle control device is connected to the first power supply via another on-vehicle control device and is supplied with power from the first power supply, the on-vehicle control device is affected by a voltage drop in the first power supply. Therefore, if a control program is being updated in such an on-vehicle control device, the update may fail due to the voltage drop in the first power supply. Therefore, by defining the on-vehicle control device as an unpermitted device, the update can be prevented from failing.

(6) Preferably, the permitted device is at least one of on-vehicle control devices configured to respectively control a plurality of devices included in a device group. The device group includes a brake, a power steering system, an indoor air conditioner, meters, an audio, a navigation device, and interior lights.

Generally, each of the aforementioned devices is connected to the first power supply in a manner so as not to be affected by a voltage drop in the first power supply. Therefore, when at least one of the on-vehicle control devices respectively controlling these devices is defined as a permitted device, it is possible to start the engine according to the user operation while continuing update of the control program.

(7) Preferably, the permitted device is an on-vehicle control device having a memory for backup of the control program, and the unpermitted device is an on-vehicle control device having no memory for backup.

By setting, as a permitted device, the on-vehicle control device having the memory for backup, even when update of the control program is interrupted due to a voltage drop with engine start, the engine start does not fail, and thus the engine can be started according to the user operation.

(8) Preferably, the control apparatus further includes a control unit configured to control the communication unit. When the determination unit has determined that start of the engine should be permitted, the control unit causes the communication unit to transmit an instruction to start the engine, to an on-vehicle control device that controls the engine.

Thus, the engine is started when start of the engine is determined to be permitted, while the engine is not started when start of the engine is determined to be unpermitted. Therefore, it is possible to avoid a failure in update of the control program due to engine start, and a failure in engine start.

(9) Preferably, when the determination unit has determined that start of the engine should not be permitted, the control unit causes the communication unit to transmit an instruction that notifies a user that start of the engine is not permitted, to an on-vehicle control device that controls a user interface device.

Thus, the user, who has performed an operation to instruct engine start, can know that the engine is not started according to the operation.

(10) A control method included in the embodiments of the present disclosure is a method of controlling on-vehicle control devices in a control apparatus according to any one of the above (1) to (9).

This control method provides the same effects as those of the control apparatuses according to the above (1) to (9).

(11) A computer program included in the embodiments of the present disclosure causes a computer to function as a control apparatus according to any one of the above (1) to (9).

This computer program provides the same effects as those of the control apparatuses according to the above (1) to (9).

[Detailed Description Of Embodiments]

Hereinafter, preferred embodiments will be described with reference to the drawings. In the following description, the same reference numerals refer to the same components and constituent elements. The names and functions thereof are also the same. Therefore, repeated description thereof is not necessary.

<First Embodiment>
[Overall Configuration of System]

FIG. 1 is a diagram showing an overall configuration of a program updating system according to an embodiment of the present disclosure.

As shown in FIG. 1, the program updating system of this embodiment includes vehicles 1, a management server 5, and a DL (download) server 6, which are communicable with each other via a wide-area communication network 2.

The management server 5 manages update information of each vehicle 1. The DL server 6 stores therein an update program. The management server 5 and the DL server 6 are operated by, for example, the automobile manufacturer of the vehicles 1, and are able to communicate with large numbers of vehicles 1 owned by users registered as members in advance.

Each vehicle 1 is equipped with: an in-vehicle network (communication network) 4 including a plurality of ECUs 30 connected by in-vehicle communication lines 16, and a gateway 10; a wireless communication unit 15; and various on-vehicle devices (not shown) controlled by the respective ECUs 30. The on-vehicle devices include: a user interface device 7 such as a display, a speaker, etc.; and a starter (hereinafter referred to as "ST") 43.

The in-vehicle network 4 has a plurality of in-vehicle communication lines, and includes a plurality of communication groups, each consisting of a plurality of ECUs 30 bus-connected to the respective in-vehicle communication lines. The gateway 10 relays communication between the communication groups. Therefore, the plurality of in-vehicle communication lines are connected to the gateway 10.

The plurality of ECUs 30 include ECUs 30A to 30D shown in FIG. 1. The ECU 30D controls the user interface device 7. The ECU 30C controls the ST 43. When a user operation to start an engine (hereinafter also referred to as "start operation") is performed, the ECU 30C drives the ST 43 to rotate a crank shaft of the engine (not shown), thereby starting the engine. The start operation is, for example, an operation of pressing a button (not shown) to instruct engine start, input of a radio signal through a remote control key to instruct engine start, or an operation of rotating an engine key.

The vehicle 1 includes a battery (hereinafter referred to as "BAT") 42 as a power supply system. The BAT 42 supplies power to: the ST 43 connected via a power supply line 17 indicated by a thick line; one or more ECUs 30A-1, 30A-2, . . . (also referred to collectively as "ECU 30A"); and one or more ECUs 30B-1, 30B-2, . . . (also referred to collectively as "ECU 30B") connected via a voltage holding circuit 41.

The ECUs 30B, which are connected to the BAT 42 via the voltage holding circuit 41, are ECUs for controlling, for example, a brake, a power steering system, an indoor air conditioner, various meters, an audio, a navigation device, and interior lights. The ECUs 30A, which are connected to the BAT 42 without the intervention of the voltage holding circuit 41, are ECUs, other than the aforementioned ECUs, for controlling power windows and door mirrors, for example.

The voltage holding circuit 41 is not limited to a specific circuit configuration. As one example, the voltage holding circuit 41 includes a resistor and a diode (both not shown) connected in parallel, and a capacitor connected in series with respect to the parallel connection. The voltage holding circuit 41 holds an output voltage of the BAT 42 whose voltage transiently drops with engine start or the like.

The wireless communication unit 15 is communicably connected to the wide-area communication network 2 such as a mobile phone network, and is connected to the gateway 10 by an in-vehicle communication line. The gateway 10 transmits, through the in-vehicle communication lines 16 to the ECUs 30, information received by the wireless communication unit 15 from external devices such as the management server 5 and the DL server 6 via the wide-area communication network 2.

The gateway 10 transmits information obtained from the ECUs 30 to the wireless communication unit 15, and the wireless communication unit 15 transmits the information to the external devices such as the management server 5.

Meanwhile, the ECUs 30 exchange information via the in-vehicle communication lines.

As for the wireless communication unit 15 mounted in the vehicle 1, apart from an on-vehicle exclusive communication terminal, a device possessed by the user of the vehicle 1, such as a mobile phone, a smart phone, a tablet-type terminal, or a notebook PC (Personal Computer), is adoptable.

In FIG. 1, the gateway 10 communicates with the external devices via the wireless communication unit 15. However, when the gateway 10 has a function of wireless communication, the gateway 10 itself may be configured to perform wireless communication with the external devices such as the management server 5.

In the program updating system shown in FIG. 1, the management server 5 and the DL server 6 are configured as separate servers. However, these servers 5 and 6 may be configured as a single server unit. Each of the management server 5 and the DL server 6 may be composed of a plurality of devices.

[Internal Configuration of Gateway]

Figure 2:
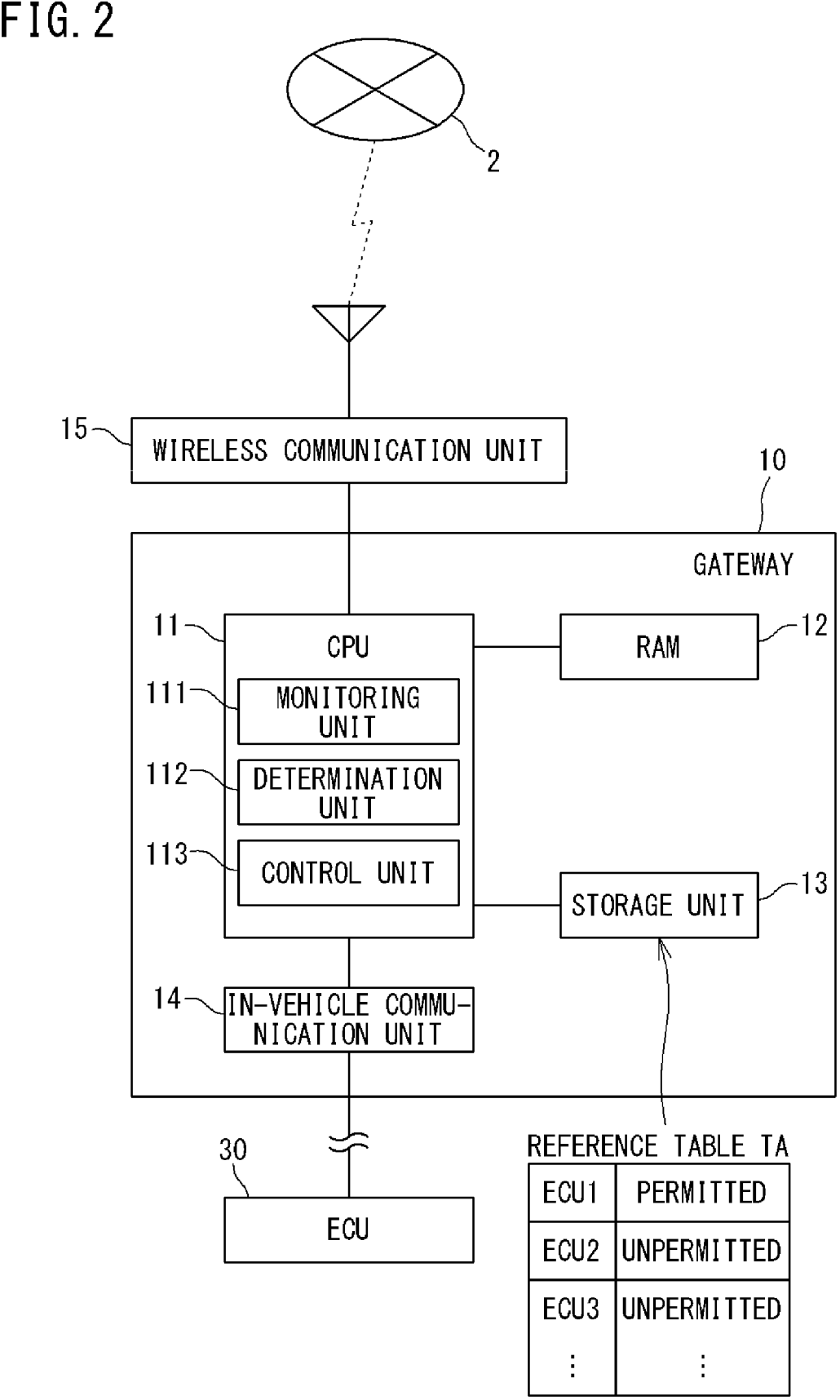
FIG. 2 is a block diagram showing an internal configuration of a gateway.

FIG. 2 is a block diagram showing the internal configuration of the gateway 10.

As shown in FIG. 2, the gateway 10 includes a CPU 11, an RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be configured as a single unit.

The CPU 11 causes the gateway 10 to function as a relay device for relaying various kinds of information, by reading out one or a plurality of programs stored in the storage unit 13 to the RAM 12, and executing the read programs.

The CPU 11 can execute a plurality of programs in parallel by switching between the plurality of programs in a time-sharing manner, for example. The CPU 11 may be a CPU representing a plurality of CPU groups. In this case, a function to be implemented by the CPU 11 is a function to be implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program to be implemented by the CPU 11 can be transferred in a state of being recorded in a well-known recording medium such as a CD-ROM or a DVD-ROM, or may be transferred by information transmission from a computer device such as a server computer.

In this aspect, the same applies to a computer program to be executed by a CPU 31 of the ECU 30 (refer to FIG. 3) described later, and a computer program to be executed by a CPU 51 of the management server 5 (refer to FIG. 4) described later.

In the following description, transfer (transmission) of data from a higher-order device to a lower-order device is also referred to as "download".

The storage unit 13 consists of, for example, a nonvolatile memory element such as a flash memory or an EEPROM (Electrically Erasable Programmable Read Only Memory). The storage unit 13 stores therein programs to be executed by the CPU 11, data required in executing the programs, and the like. The storage unit 13 also stores therein update programs and the like, for the respective ECUs 30, which have been received from the DL server 6 and are to be downloaded.

The plurality of ECUs 30 are connected to the in-vehicle communication unit 14 via the in-vehicle communication lines arranged in the vehicle 1. The in-vehicle communication unit 14 performs communication (also referred to as CAN communication) with the ECUs 30 in accordance with the CAN (Controller Area Network) standard, for example. Apart from the CAN, the in-vehicle communication unit 14 may adopt other communication standards such as CANFD (CAN with Flexible Data Rate), LIN (Local Interconnect Network), Ethernet (registered trademark), MOST (Media Oriented Systems Transport: MOST is a registered trademark), etc. Among the plurality of in-vehicle communication lines, some communication lines may be based on different communication standards.

The in-vehicle communication unit 14 transmits information provided from the CPU 11 to target ECUs 30, and provides information received from the ECUs 30 to the CPU 11. Apart from the aforementioned communication standards, the in-vehicle communication unit 14 may communicate with the ECUs 30 in accordance with other communication standards used for the in-vehicle network 4.

The wireless communication unit 15 consists of a wireless communication apparatus including an antenna and a communication circuit that executes transmission/reception of radio signals through the antenna. The wireless communication unit 15 is able to communicate with the external devices when connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that functions as a relay device in the vehicle 1 may be adopted. The wired communication unit has a connector to which a communication cable conforming to a standard such as USB (Universal Serial Bus) or RS232C is connected, and performs wired communication with another communication device connected thereto via the communication cable.

When the other communication device and an external device such as the management server 5 are able to perform wireless communication via the wide-area communication network 2, the external device becomes communicable with the gateway 10 through a communication path including the external device, the other communication device, the wired communication unit, and the gateway 10 in this order.

[Internal Configuration of ECU]

Figure 3:
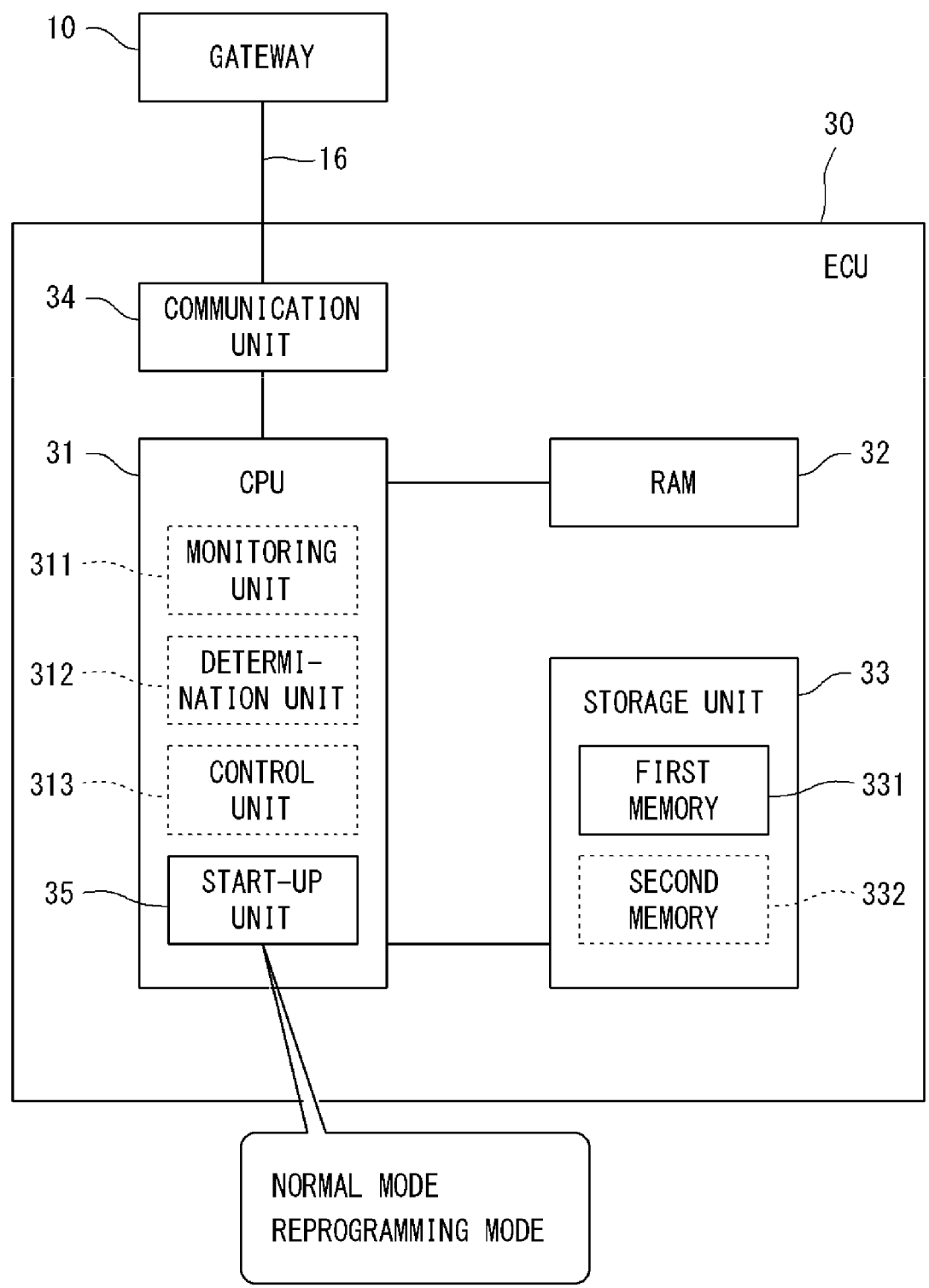
FIG. 3 is a block diagram showing an internal configuration of an ECU.

FIG. 3 is a block diagram showing an internal configuration of each ECU 30.

As shown in FIG. 3, the ECU 30 includes a CPU 31, an RAM 32, a storage unit 33, a communication unit 34, and the like. The ECUs 30 are on-vehicle control devices that individually control target equipment installed in the vehicle 1. Examples of the types of the ECUs 30 include a power supply control ECU, an engine control ECU, a steering control ECU, and a door lock control ECU.

The CPU 31 controls the operation of target equipment that the CPU 31 is in charge of, by reading out one or a plurality of programs previously stored in the storage unit 33 to the RAM 32, and executing the read programs. The CPU 31 may also be a CPU representing a plurality of CPU groups, and a control to be performed by the CPU 31 may be a control to be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

The storage unit 33 stores therein the programs to be read and executed by the CPU 31. Examples of information stored in the storage unit 33 include: a computer program that causes the CPU 31 to execute information processing for controlling target equipment that is an in-vehicle control target; and a control program that is data, such as parameters and map information, to be used when the computer program is executed.

The gateway 10 is connected to the communication unit 34 via the in-vehicle communication line arranged in the vehicle 1. The communication unit 34 communicates with the gateway 10 in accordance with a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 in accordance with other communication standards that are used for the on-vehicle network, apart from the above communication standards.

The CPU 31 of the ECU 30 includes a start-up unit 35 that switches the mode of control performed by the CPU 31, between a "normal mode" and a "reprogramming mode".

The normal mode is a control mode in which the CPU 31 of the ECU 30 executes original control for the target equipment (e.g., engine control for a fuel engine, or door lock control for a door lock motor).

The reprogramming mode is a control mode for updating the control program used for control of the target equipment.

That is, the reprogramming mode is a control mode in which the CPU 31 performs erasing/overwriting of data of the control program from/on an ROM area in the storage unit 33. Only when the CPU 31 is in this control mode, the CPU 31 is allowed to update the control program stored in the ROM area in the storage unit 33 to a new version of the control program.

When the CPU 31, in the reprogramming mode, writes the new version of the control program into the storage unit 33, the start-up unit 35 temporarily restarts (resets) the ECU 30, and executes a verifying process on a storage area where the new version of the control program has been written.

After completion of the verifying process, the start-up unit 35 causes the CPU 31 to operate with the updated control program.

The process of downloading the update program from the DL server 6 through the gateway 10 to the ECU 30 and then updating the control program by using the update program, is also referred to as "on-line update".

[Internal Structure of Management Server]

Figure 4:
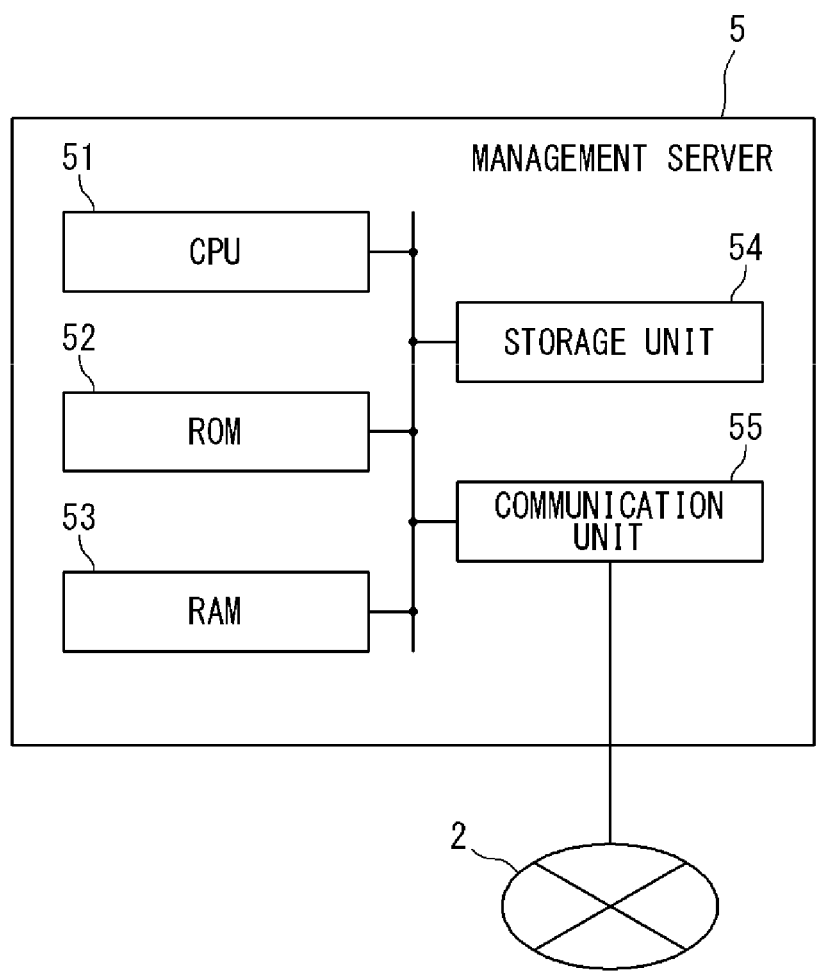
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53, and executing the read programs, the CPU 51 controls the operation of each hardware component, and causes the management server 5 to function as an external device that is able to communicate with the gateway 10. The CPU 51 may also be a CPU representing a plurality of CPU groups, and a function to be implemented by the CPU 51 may be a function to be implemented by the plurality of CPU groups in cooperation with each other.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process in accordance with a predetermined communication standard. The communication unit 55 executes the communication process when connected to the wide-area communication network 2 such as a mobile phone network. The communication unit 55 transmits information provided from the CPU 51 to external devices via the wide-area communication network 2, and provides information received via the wide-area communication network 2 to the CPU 51.

[Control Program Updating Sequence]

FIG. 5 is a sequence diagram showing an example of a flow of control program on-line update which is executed in the program update system of the present embodiment. One or a plurality of update programs are stored in the DL server 6. As one example, the management server 5 determines a timing to update a control program of an ECU of a vehicle 1 registered in advance. The update timing may be set by, for example, the automobile manufacturer of the vehicle 1.

The control program includes not only the program itself but also data, such as parameters and map information, used for execution of the program. The term "control program" represents the program and the data. Therefore, the update program includes not only a program for updating a program but also data for updating data used for execution of the program.

When the timing to update the control program has arrived, the management server 5 transmits update notification to the gateway 10 of the corresponding vehicle 1 (step S1). In step S1, update information (e.g., a destination URL where the update program is stored, the size of the update program, etc.) is transmitted together with a download request from the management server 5 to the gateway 10.

Upon receiving the update notification from the management server 5, the gateway 10 relays the update program downloaded from the DL server 6 to an ECU (hereinafter referred to as "target ECU") 30 whose control program is to be updated. That is, the gateway 10 requests, to the DL server 6, download of the update program on the basis of the update information (step S2).

Upon receiving the download request from the gateway 10, the DL server 6 transmits the update program to be downloaded to the gateway 10, and requests update of the control program (step S3).

After downloading the update program, the gateway 10 transfers the update program to the target ECU 30, and requests update of the control program (step S4). The gateway 10 may transfer the update program when receiving permission for update from the user.

Further, the gateway 10 executes a start control process of controlling engine start of the vehicle 1 (step S6). The start control process will be described later. In FIG. 5, the start control process is started after the gateway 10 has requested the target ECU 30 to update the control program in step S4. However, the start control process may be constantly executed regardless of the timing of update request. In other words, the start control process may be executed concurrently with the on-line update shown in FIG. 5.

Upon receiving the update program, the target ECU 30 expands the update program and updates the control program in response to the request from the gateway 10 (step S5). Upon completing the update of the control program, the target ECU 30 notifies the gateway 10 of the completion of update (step S7). Upon receiving this notification, the gateway 10 notifies the DL server 6 of the completion of update (step S8).

[Functional Configuration of Gateway]

The start control process in step S6 in FIG. 5 includes the following three steps STEP 1 9 to STEP 3 to be executed in this order.

STEP 1: a monitoring step of monitoring whether or not a start operation has been performed.

STEP 2: a determination step of determining whether or not to permit start of the ST 43 according to a start operation.

STEP 3: a start control step of causing the ST 43 to start in accordance with the determination result in the determination step.

With reference to FIG. 2, the CPU 11 of the gateway 10 includes, as functions for executing the start control process, a monitoring unit 111 for executing the monitoring step, a determination unit 112 for executing the determination step, and a control unit 113 for executing the start control step. These functions are implemented by the CPU 11 when the CPU 11 reads out one or a plurality of programs stored in the storage unit 13, and executes the read programs. However, at least a part of the functions may be implemented by hardware such as an electronic circuit.

The function of the CPU 11 represented by the monitoring unit 111 (hereinafter, this function is referred to as "monitoring unit 111") monitors whether or not a start operation has been performed, by monitoring a frame received from the ECU 30C for controlling the ST 43.

When the monitoring unit 111 has detected a start operation, the function of the CPU 11 represented by the determination unit 112 (hereinafter, this function is referred to as "determination unit 112") determines whether or not to permit start of the ST 43, i.e., engine start, according to the start operation. When the target ECU whose control program is being updated is a specific ECU, the determination unit 112 does not permit engine start. For this purpose, the storage unit 13 of the gateway 10 stores therein, in advance, a reference table TA which allows specification of an ECU for which engine start is permitted and an ECU for which engine start is not permitted. When the monitoring unit 111 has detected that a start operation was performed, the determination unit 112 determines whether or not to permit engine start according to the start operation, on the basis of the reference table TA and the state of update in the target ECU at the detection of the start operation. That is, whether or not to permit engine start according to the start operation is determined by determining, with reference to the reference table TA, whether the target ECU is an ECU for which engine start is permitted during update, or an ECU for which engine start is not permitted during update.

As one example, the reference table TA shown in FIG. 2 defines, for each ECU, whether or not to permit engine start while update is being executed in the ECU. As another example, the reference table TA may be a table that defines only ECUs for which engine start is permitted. In this case, as for ECUs that are not defined in the table, the determination unit 112 determines that engine start should not be permitted for these ECUs. Alternatively, the reference table TA may be a table that defines only ECUs for which engine start is not permitted. In this case, as for ECUs that are not defined in the table, the determination unit 112 determines that engine start should be permitted for these ECUs.

Specifically, the determination unit 112 determines that engine start should not be permitted when the following condition 1 is satisfied, and determines that engine start should be permitted when the following condition 2 or 3 is satisfied.

Condition 1: there is an ECU that is during update when a start operation is detected, and the target ECU is an unpermitted ECU.

Condition 2: there is no ECU during update when a start operation is detected.

Condition 3: there is an ECU that is during update when a start operation is detected, and the target ECU is a permitted ECU.

Using the reference table TA enables easy and highly accurate determination as to whether or not to permit engine start.

Preferably, the reference table TA defines that an ECU is a permitted ECU or an unpermitted ECU, according to the following (A) or (B), or a combination of the following (A) and (B).

(A) relationship of connection to the power supply (B) configuration of the storage unit 33

When the reference table TA defines permitted/unpermitted ECUs according to the above (A), the permitted ECU and the unpermitted ECU are as follows.

Permitted ECU: an ECU that is connected to the BAT 42 via the voltage holding circuit 41.

Unpermitted ECU: an ECU that is connected to the BAT 42 without the intervention of the voltage holding circuit 41.

In the example of FIG. 1, the ECU 30B is a permitted ECU and the ECU 30A is an unpermitted ECU.

As for the ECU 30A connected to the BAT 42 without the intervention of the voltage holding circuit 41, power required for update may not be supplied thereto due to a voltage drop in the BAT 42 caused by engine start. If update is being executed in the ECU 30A, the update may fail. Therefore, if engine start is not permitted, the update is prevented from failing.

Meanwhile, as for the ECU 30B connected to the BAT 42 via the voltage holding circuit 41, power supplied thereto is maintained even when a voltage drop in the BAT 42 is caused by engine start. Therefore, even when update is being executed in the ECU 30B, the update is not affected by the voltage drop. Thus, engine start is permitted, whereby the engine is started according to the user operation while the update is continued.

When the reference table TA defines permitted/unpermitted ECUs according to the above (B), the permitted ECU and the unpermitted ECU are as follows.

Permitted ECU: an ECU in which the storage unit 33 includes both a first memory 331 and a second memory 332.

Unpermitted ECU: an ECU in which the storage unit 33 includes a first memory 331 and does not include a second memory 332.

The first memory 331 and the second memory 332 are storage areas, shown in FIG. 3, having the following functions.

First memory: a functional memory for storing therein a program that is read and executed by the CPU 31.

Second memory: a stand-by memory used for backup of the program.

As for the ECU 30 in which the storage unit 33 includes the first memory 331 and does not include the second memory 332, if update fails due to a voltage drop in the BAT 42 caused by engine start during the update, the engine start may fail unless the control program of the ECU is returned to the control program before update. Therefore, if engine start is not permitted with respect to this ECU, the engine start can be prevented from failing.

Meanwhile, in the ECU 30 in which the storage unit 33 includes both the first memory 331 and the second memory 332, the control program before update is retained in one of the memories while update of the control program is performed in the other memory. Therefore, even when update fails due to a voltage drop in the BAT 42 caused by engine start during the update, the control program before update, which is retained, can be used. Thus, engine start according to the start operation can be prevented from failing.

The function of the CPU 11 represented by the control unit 113 (hereinafter, this function is referred to as "control unit 113") instructs the ECU 30 (ECU 30C in FIG. 1) for controlling the ST 43 to start the ST 43, when the result of the determination by the determination unit 112 is that engine start should be permitted. Thus, the control unit 113 generates a frame that is information to be transmitted through CAN communication with the ECU 30C. This frame includes data that instructs start of the ST 43. This frame is transmitted to the ECU 30C by the in-vehicle communication unit 14.

When the result of the determination by the determination unit 112 is that engine start is not permitted, the control unit 113 does not execute the aforementioned start control step. Preferably, the control unit 113 executes a start control step of notifying the user that engine start is not permitted, through the user interface device 7. When the user interface device 7 is a display, the determination unit 112 causes the user interface device 7 to display a notification screen shown in FIG. 6A. For this purpose, the control unit 113 generates a frame to be transmitted to the ECU 30D for controlling the user interface device 7. This frame includes data for instructing display of the notification screen shown in FIG. 6A. This frame is transmitted to the ECU 30C by the in-vehicle communication unit 14.

More preferably, the control unit 113 obtains a time (update time) X required until update is completed in the target ECU, and includes the update time X in the frame. The update time X may be obtained from the management server 5, or may be calculated based on the size of the update program obtained from the management server 5 and on the throughput of the target ECU, which is stored in advance. Thus, as shown in FIG. 6A, the control unit 113 can cause the user interface device 7 to display the time required until engine start is permitted.

As another example, when the user interface device 7 is a device such as a touch panel that receives a user operation, the control unit 113 may cause the user interface device 7 to display a notification screen shown in FIG. 6B that receives a user operation instructing interruption of update. Upon receiving the user operation, the control unit 113 instructs the target ECU to interrupt update. Thus, the user can prioritize engine start over update of the control program.

[Start Control Process]

Figure 7:
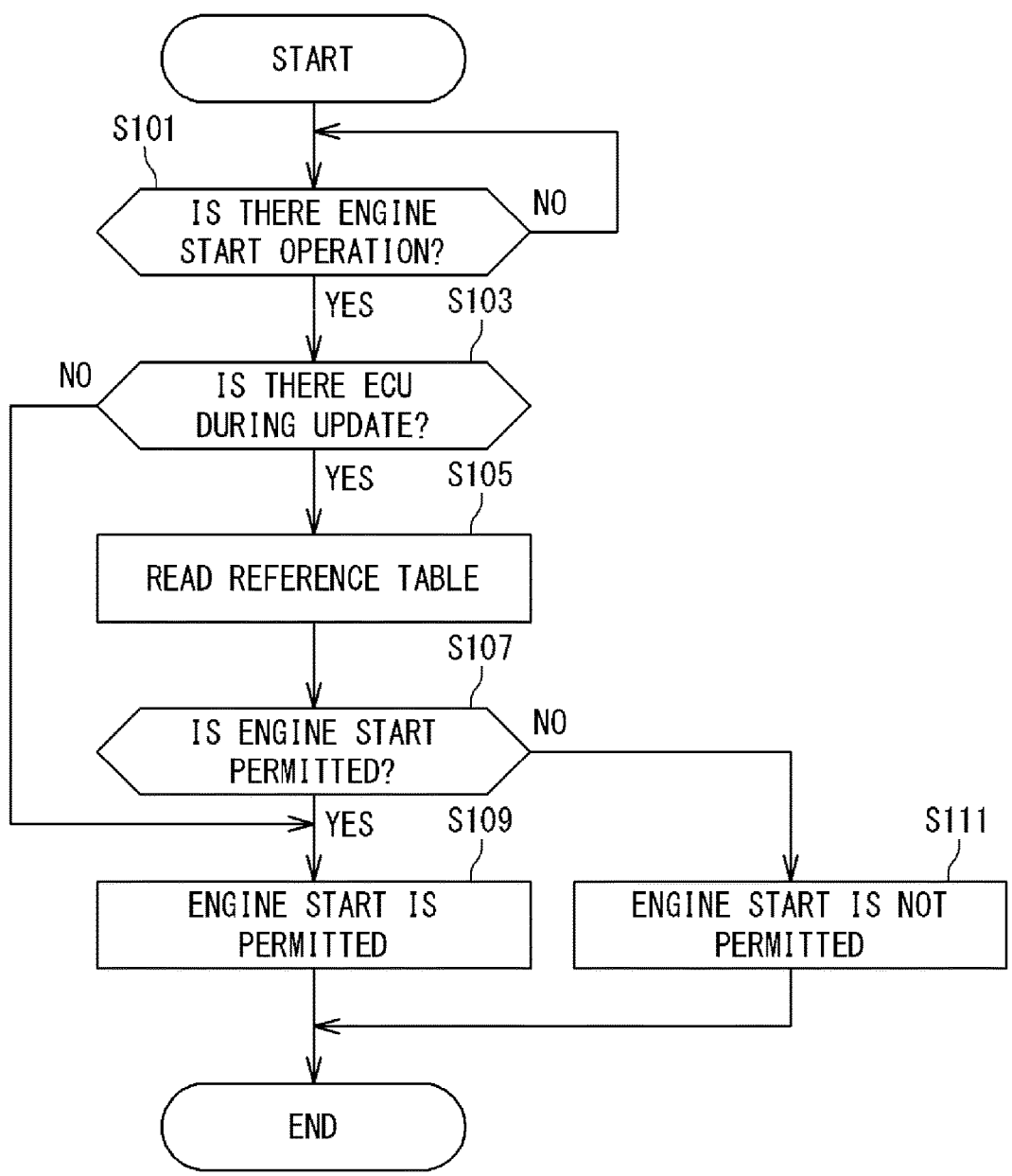
FIG. 7 is a flowchart showing the specific content of an update control process performed in the program updating system according to a first embodiment.

FIG. 7 is a flowchart showing a specific example of the start control process in step S6 in FIG. 5. The process shown in the flowchart of FIG. 7 is executed by the CPU 11 of the gateway 10 when the CPU 11 reads out one or a plurality of programs stored in the storage unit 13 onto the RAM 12, and executes the read programs. The process shown in FIG. 7 may be started when the gateway 10 is activated, or after the target ECU is requested to perform update in step S4.

With reference to FIG. 7, the CPU 11 monitors a frame received from the ECU 30C for controlling the ST 43, thereby monitoring whether or not a start operation has been performed. Upon detecting a start operation (YES in step S101), the CPU 11 checks whether or not there is an ECU whose control program is being updated. When there is no ECU whose control program is being updated at the time point when the start operation has been performed (NO in step S103) (above condition 2), the CPU 11, without reading the reference table TA, determines that engine start according to the start operation should be permitted (step S109). In this case, the CPU 11 generates a frame including data that instructs the ECU 30C for controlling the ST 43 to start the ST 43. Then, the CPU 11 causes the in-vehicle communication unit 14 to transmit this frame to the ECU 30C. Thus, the ST 43 is started according to the user's start operation, and the engine is started.

If there is an ECU whose control program is being updated at the time point when the start operation has been performed (YES in step S103), the CPU 11 reads the reference table TA stored in the storage unit 13 (step S105), and determines whether or not to permit start of the ST 43, i.e., engine start, depending on whether the target ECU is a permitted ECU or an unpermitted ECU.

When the target ECU is a permitted ECU (YES in step S107) (above condition 3), the CPU 11 determines that engine start according to the start operation should be permitted (step S109). In this case, the CPU 11 generates a frame including data that instructs the ECU 30C for controlling the ST 43 to start the ST 43. Then, the CPU 11 causes the in-vehicle communication unit 14 to transmit this frame to the ECU 30C. Thus, the ST 43 is started according to the user's start operation, and the engine is started.

When the target ECU is an unpermitted ECU (NO in step S107) (above condition 1), the CPU 11 determines that engine start according to the start operation should not be permitted (step S111). In this case, the CPU 11 does not execute the process of transmitting a frame to the ECU 30C. Alternatively, the CPU 11 generates a frame including data that instructs the ECU 30C not to start the ST 43, and causes the in-vehicle communication unit 14 to transmit this frame to the ECU 30C. Thus, the ST 43 is not started even when the user has performed a start operation, and the engine is not started.

Preferably, when the user interface device 7 is a display, the CPU 11 generates a frame for displaying the notification screen shown in FIG. 6A or FIG. 6B, and causes the in-vehicle communication unit 14 to transmit this frame to the ECU 30D for controlling the user interface device 7. Thus, the notification screen shown in FIG. 6A or FIG. 6B is displayed on the user interface device 7, which allows the user to know the reason why the engine is not started in spite of the start operation.

More preferably, the CPU 11 obtains an update time in the target ECU, and includes the update time in the frame to be transmitted to the ECU 30D so that the update time is displayed on the notification screen as shown in FIG. 6A or FIG. 6B. Thus, the user is allowed to know the time required until the engine becomes able to start. More preferably, upon receiving an instruction to interrupt update through the notification screen of FIG. 6B, the CPU 11 generates a frame that instructs the target ECU to interrupt the update process, and causes the in-vehicle communication unit 14 to transmit the frame. Thus, the user can prioritize engine start over update of the control program.

[Effect of First Embodiment]

In the program updating system according to the first embodiment, in the case where there is an ECU whose control program is being updated when a start operation has been detected, and the target ECU is defined as an unpermitted ECU in the reference table TA, the engine is not started according to the start operation. Therefore, a situation is avoided in which engine start fails due to unsuccessful update of the control program caused by a voltage drop with start of the ST 43.

For example, when the target ECU is an ECU that is connected to the BAT 42 without the intervention of the voltage holding circuit 41, the engine is not started according to the start operation. Therefore, a situation is avoided in which update of the control program fails due to a voltage drop with start of the ST 43.

Furthermore, for example, the engine is not started according to the start operation when the target ECU has only the first memory 331 and does not have the second memory 332, while the engine is started when the target ECU has the second memory 332. Thus, even when update of the control program fails due to a voltage drop with start of the ST 43, engine start can be performed according to the start operation.

<Second Embodiment>

Figure 8:
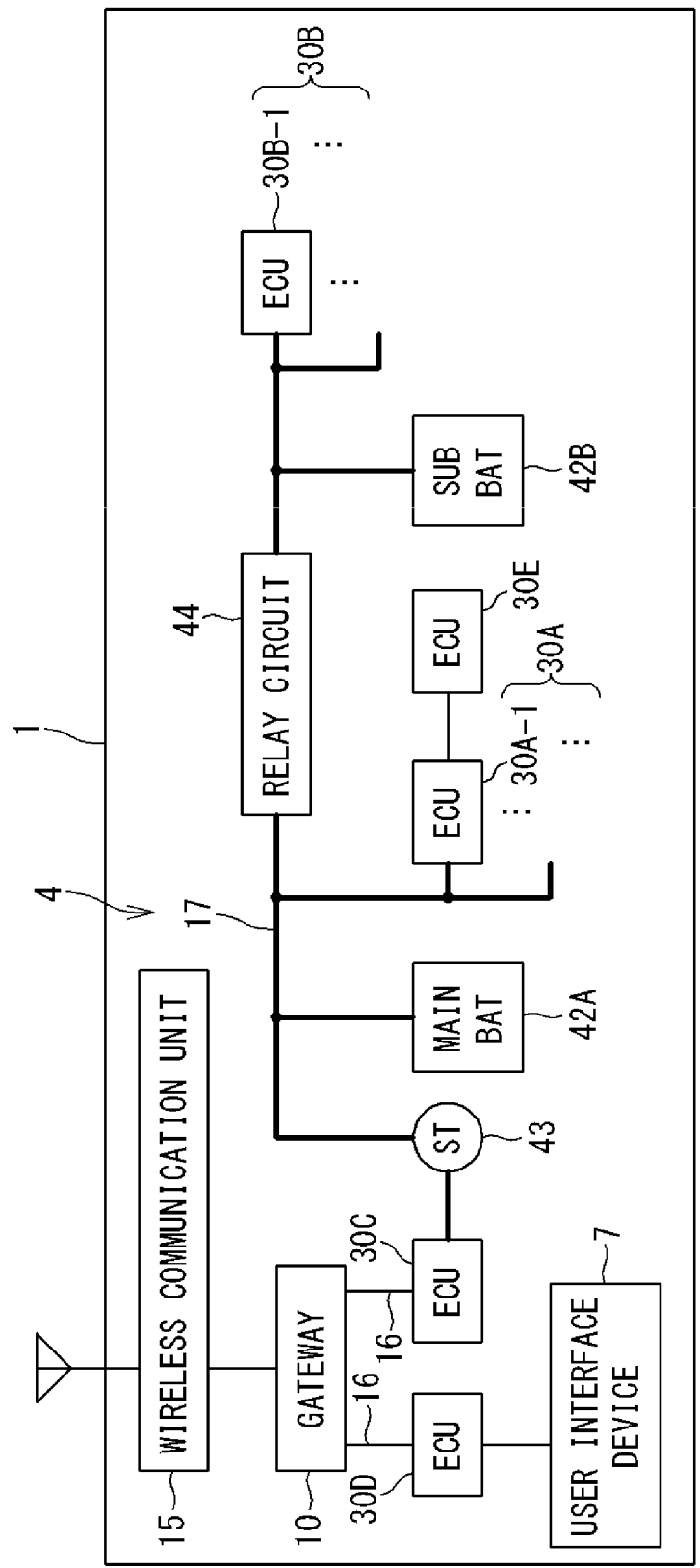
FIG. 8 is a schematic diagram showing an example of a power supply configuration in a vehicle.

In the case where the reference table TA defines permitted/unpermitted ECUs according to the above (B), the permitted ECU and the unpermitted ECU are not limited to the above examples. FIG. 8 is a schematic diagram showing another example of the power supply configuration of the vehicle 1. The vehicle 1 shown in FIG. 8 has, as a power supply system, a plurality of power supplies, i.e., a main battery (main BAT) 42A and a sub battery (sub BAT) 42B.

The main BAT 42A supplies power to the ST 43 and the ECU 30A which are connected thereto via the power supply line 17. When the relay circuit 44 is ON, the main BAT 42A further supplies power to the ECU 30B connected thereto via the relay circuit 44. When the relay circuit 44 is OFF, the sub BAT 42B supplies power to the ECU 30B connected thereto via the power supply line 17.

In the case where another ECU (ECU 30E in FIG. 8) is further connected to the ECU 30A which is connected to the main BAT 42A via the power supply line 17, the main BAT 42A also supplies power to the ECU 30E via the ECU 30A.

In the case where the vehicle 1 has the power supply configuration shown in FIG. 8 and the reference table TA defines permitted/unpermitted ECUs according to the above (B), the permitted ECU and the unpermitted ECU are as follows, for example.

Permitted ECU: an ECU connected to the sub BAT 42B

Unpermitted ECU: an ECU that is not connected to the sub BAT 42B, and is connected to only the main BAT 42A In the example of FIG. 8, the ECU 30B is a permitted ECU, and the ECU 30A is an unpermitted ECU.

The ECU 30B connected to the sub BAT 42B is supplied with power from the sub BAT 42B even when the voltage of the main BAT 42A drops with engine start. Therefore, the ECU 30B, even during update, is not affected by the voltage drop in the main BAT 42A. Thus, engine start is permitted, whereby the engine is started according to the user operation while the update is continued.

<Third Embodiment>

In the reference table TA shown in FIG. 1, each of the ECUs installed in the vehicle 1 is defined as a permitted ECU or an unpermitted ECU. However, the reference table TA need not define, for all the ECUs installed in the vehicle 1, whether each ECU is a permitted ECU or an unpermitted ECU. For example, some ECUs, such as an ECU that is newly installed after storage of the table TA in the storage unit 13 of the gateway 10, may not be defined in the table TA.

In the case where the target ECU is not defined whether to be a permitted ECU or an unpermitted ECU in the reference table TA, and is connected to the power supply via an ECU that is defined whether to be a permitted ECU or an unpermitted ECU (this ECU is also referred to as "intervening ECU"), the determination unit 112 determines whether or not to permit engine start, on the basis of the connection relationship of the target ECU to the intervening ECU. That is, the determination unit 112 determines whether or not to permit engine start, on the basis of whether the intervening ECU is a permitted ECU or an unpermitted ECU in the reference table TA.

In the case where the target ECU is the ECU 30E shown in FIG. 8 and, in the reference table TA, it is not defined whether the ECU 30E is a permitted ECU or an unpermitted ECU as for engine start, the determination unit 112 regards the ECU 30A-1, to which the ECU 30E is connected, as an intervening ECU, and determines whether the ECU 30A-1 is a permitted ECU or an unpermitted ECU in the reference table TA. Since the ECU 30A-1 is an unpermitted ECU as described above, the determination unit 112 determines that engine start should not be permitted.

The ECU 30 (second ECU), which is supplied with power from the power supply via the ECU 30 (first ECU) that is defined as an unpermitted ECU because it is affected by a voltage drop in the power supply, is also affected by the voltage drop in the power supply, like the first ECU. Therefore, when engine start is not permitted while such an ECU is during update, the update in the ECU is prevented from failing.

The disclosed feature is implemented by one or more modules. For example, the feature can be implemented by: hardware modules such as circuit elements, etc.; software modules defining processes that realize the feature; or a combination of the hardware modules and the software modules.

The disclosed feature may be provided as a program, which is a combination of one or more software modules, for causing a computer to execute the aforementioned operation. Such a program may be recorded in a computer-readable recording medium, such as a flexible disc, a CD-ROM (Compact Disk-Read Only Memory), an ROM, an RAM, a memory card, or the like adjunct to the computer, and provided as a program product. Alternatively, the program may be provided by being recorded in a recording medium such as a hard disk incorporated in the computer. The program may also be provided by being downloaded through a network.

The program according to the present disclosure may call up necessary modules in a predetermined array at a predetermined timing from among program modules provided as a portion of an operating system (OS) of a computer, and may cause processing to be executed. In this case, the modules are not included in the program itself, and the processing is executed in cooperation with the OS. The program according to the present disclosure also includes such a program including no modules.

The program according to the present disclosure may be provided by being incorporated in a portion of another program. In that case as well, modules included in the other program are not included in the program itself, and processing is executed in cooperation with the other program. The program according to the present disclosure also includes such a program incorporated in another program. A program product to be provided is installed in a program storage unit such as a hard disk, and then executed. The program product includes the program itself and a recording medium in which the program is recorded.

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
4 in-vehicle network
5 management server
6 DL server
7 user interface device
10 gateway (control apparatus)
11 CPU
12 RAM
13 storage unit
14 in-vehicle communication unit
15 wireless communication unit
16 in-vehicle communication line
17 power supply line
30, 30A to 30E ECU
31 CPU
32 RAM
33 storage unit
34 communication unit
35 start-up unit
41 voltage holding circuit
42 BAT
42A main BAT
42B sub BAT
43 ST
44 relay circuit
51 CPU
52 ROM
53 RAM
54 storage unit
55 communication unit
111 monitoring unit
112 determination unit
113 control unit
331 first memory
332 second memory (memory for backup of control program)
TA reference table

The invention claimed is:

1. A control apparatus comprising:
a communication unit configured to communicate with one or a plurality of on-vehicle control devices via an in-vehicle communication line;
an acquisition unit configured to acquire an instruction signal that instructs start of an engine; and
a determination unit configured to determine whether or not to permit start of the engine, on the basis of whether or not there is an on-vehicle control device whose control program is being updated when the instruction signal is acquired.

2. The control apparatus according to claim 1, wherein when there is an on-vehicle control device whose control program is being updated, the determination unit further determines whether or not to permit start of the engine, on the basis of a type of a target device that is the on-vehicle control device whose control program is being updated.

3. The control apparatus according to claim 2, wherein the type is defined on the basis of a connection relationship between the on-vehicle control device and an on-vehicle power supply.

4. The control apparatus according to claim 3, wherein the type includes a permitted device for which start of the engine during update is permitted, and an unpermitted device for which start of the engine during update is not permitted,
the permitted device is an on-vehicle control device connected to a first power supply, which supplies power to a starter for starting the engine, via a voltage holding circuit, and
the unpermitted device is an on-vehicle control device connected to the first power supply without an intervention of the voltage holding circuit.

5. The control apparatus according to claim 4, wherein in a case where the target device is connected to the first power supply via another on-vehicle control device, the determination unit determines whether or not to permit start of the engine, by using the type of the other on-vehicle control device.

6. The control apparatus according to claim 3, wherein the type includes a permitted device for which start of the engine during update is permitted, and an unpermitted device for which start of the engine during update is not permitted,
the permitted device is an on-vehicle control device connected to a second power supply that does not supply power to a starter for starting the engine, and
the unpermitted device is an on-vehicle control device that is not connected to the second power supply and is connected to a first power supply that supplies power to the starter for starting the engine.

7. The control apparatus according to claim 3, wherein a permitted device, for which start of the engine during update is permitted, is at least one of on-vehicle control devices configured to respectively control a plurality of devices included in a device group described below,
device group: a brake, a power steering system, an indoor air conditioner, meters, an audio, a navigation device, and interior lights.

8. The control apparatus according to claim 2, wherein the type is defined based on a memory configuration of a storage unit of the on-vehicle control device.

9. The control apparatus according to claim 8, wherein the type includes a permitted device for which start of the engine during update is permitted, and an unpermitted device for which start of the engine during update is not permitted,
the permitted device is an on-vehicle control device having a memory for backup of the control program, and the unpermitted device is an on-vehicle control device having no memory for backup.

10. The control apparatus according to claim 2, further comprising a storage unit configured to store therein a reference table defining that the type of the target device is any one of the following types, wherein
the determination unit determines the type of the target device on the basis of the reference table,
permitted device: an on-vehicle control device for which start of the engine during update of the control program is permitted,
unpermitted device: an on-vehicle control device for which start of the engine during update of the control program is not permitted.

11. The control apparatus according to claim 10, wherein the determination unit determines that start of the engine should not be permitted when condition 1 described below is satisfied, and determines that start of the engine should be permitted when condition 2 or condition 3 described below is satisfied,
condition 1: the control program is being updated when the instruction signal is detected, and the target device is an unpermitted device,
condition 2: there is no on-vehicle control device whose control program is being updated when the instruction signal that instructs start of the engine is detected,
condition 3: the control program is being updated when the instruction signal that instructs start of the engine is detected, and the target device is a permitted device.

12. The control apparatus according to claim 1, further comprising a control unit configured to control the communication unit, wherein
when the determination unit has determined that start of the engine should be permitted, the control unit causes the communication unit to transmit an instruction to start the engine, to an on-vehicle control device that controls the engine.

13. The control apparatus according to claim 12, wherein when the determination unit has determined that start of the engine should not be permitted, the control unit causes the communication unit to transmit an instruction that notifies a user that start of the engine is not permitted, to an on-vehicle control device that controls a user interface device.

14. A control method used by a control apparatus configured to communicate with one or a plurality of on-vehicle control devices via an in-vehicle communication line, the method being configured to control the one or the plurality of on-vehicle control devices, the method comprising:
acquiring an instruction signal that instructs start of an engine; and
determining whether or not to permit start of the engine, on the basis of whether or not there is an on-vehicle control device whose control program is being updated when the instruction signal is acquired.

15. A non-transitory computer readable storage medium storing a computer program for causing a computer to function as a control apparatus configured to communicate with one or a plurality of on-vehicle control devices via an in-vehicle communication line,
the computer program causing the computer to function as:
an acquisition unit configured to acquire an instruction signal that instructs start of an engine; and
a determination unit configured to determine whether or not to permit start of the engine, on the basis of whether or not there is an on-vehicle control device whose control program is being updated when the instruction signal is acquired.

* * * * *